Patented Nov. 26, 1940

2,223,184

UNITED STATES PATENT OFFICE 2,223,184

SPLITTING UP OF EXTRACTS OBTAINED FROM SOLID CARBONACEOUS MATERIALS

Mathias Pier, Heidelberg, Walter Kroenig, Ludwigshafen - on - the - Rhine, and Wolfgang Jaeckh, Heidelberg, Germany, assignors, by mesne assignments, to William E. Currie, New York, N. Y.

No Drawing. Application August 10, 1937, Serial No. 158,372. In Germany August 15, 1936

5 Claims. (Cl. 196—13)

The present invention relates to improvements in the splitting up of extracts obtained from solid carbonaceous materials.

It has already been proposed to extract solid carbonaceous substances, such as mineral coals, brown coals, shales or peat, at elevated temperatures with solvents, such as benzene, alcohol or tetrahydronaphthalene, if desired in the presence of hydrogen with or without the use of pressure, or to hydrogenate them under mild conditions, i. e. under conditions which have only a slight depolymerising action. In this way black masses of more or less high melting point are obtained which have a uniform appearance.

We have now found that the extracts and hydrogenation products thus obtained, after separation of the ashes and undecomposed coal, can be divided into fractions which are chemically different from each other, namely into a specifically lighter wax-like fraction and a specifically heavier asphaltic fraction by simple mechanical treatment, such as by sedimentation and/or centrifuging, if desired in the presence of a solvent, as for example a part of the extraction agent, and at elevated temperature.

As initial materials may be mentioned mineral coals, oil shales, asphaltic rocks, peat and the like, but especially bituminous brown coals. The initial materials are finely ground and made into a paste with a solvent or a mixture of two or more solvents; for example from 80 to 200 parts of solvent may be used for each 100 parts of coal. The paste is then either subjected to a mild hydrogenating treatment under pressure or pressed into an extraction vessel and extracted at high pressure, as for example from 50 to 200 atmospheres or more, and at elevated temperature, as for example from 370° to 420° centigrade. The extraction may also be carried out in two or more stages, as for example at increasing pressures and/or temperatures and the increase in pressure and/or temperature may be effected in one or more reaction vessels. If desired, the extraction may also be carried out in the presence of water, hydrogen, carbon monoxide or inactive gases, such as nitrogen or methane.

The products leaving the extraction apparatus or those obtained by mild hydrogenation under pressure are freed from water of reaction in known manner, as for example by distillation. The solid constituents insoluble in the products which consist mainly of ashes and undecomposed coals, are separated by centrifuging or by filtration. In many cases it is preferable to adopt both measures by first removing the major portion of the solid substances by centrifuging and then effecting the fine purification by filtration. The residues from the centrifuging and filtration are washed with fresh solvent to avoid waste.

The extraction agent or solvent or diluting agent is separated from the centrifuged or filtered product by distillation. If desired a part only of such solvent or agent may be separated and the subsequent splitting up of the extract be carried out in the presence of 5, 10, 20 per cent or more of solvent (with reference to the extract). Instead of the solvent removed, another suitable solvent may be added in the said amounts. The separation is particularly well influenced by the addition of such solvents as have a good solvent power for wax-like substances and a low solvent power for asphaltic substances.

The extract may be divided by withdrawing it while still hot from the distillation vessel in which the complete or partial removal of the solvent has taken place and then allowing it to cool very slowly. Two layers are thus gradually formed of which the lower asphaltic layer solidifies first so that a separation is readily possible. No formation of layers takes place when the cooling is effected rapidly.

A more rapid and a sharper separation is obtained by centrifuging. For this purpose there may be used either continuously working centrifuges from which the two groups of substances are withdrawn separately, or discontinuously operated centrifuges.

In order to effect the most complete recovery of the wax-like substances possible, it is preferable in many cases to add the wax-like substances obtained in an earlier working operation wholly or partly in a subsequent operation to the mixture before distilling off the extraction agent, because by the displacement of the relative proportions of wax-like to asphaltic groups of substances the separation is frequently facilitated and the sharpness of the separation increased.

The wax-like products may be used, if desired, after purification, for instance by means of selective agents, as initial materials for the preparation of insulation products, boot-polish, ceresine-like products or oxidation products. Furthermore they can be transformed into valuable lubricating oils by slight hydrogenation or into hydrocarbons of lower boiling point by heat-treatment under pressure particularly by destructive hydrogenation, if desired, in the presence of catalysts. The products thus obtained may be separated into substances rich in hydrogen and substances poor in hydrogen by means of selective agents, for instance liquid sulphur dioxide. The products rich in hydrogen are valuable Diesel-oils or illuminating oils or may be further cracked to produce gasoline. The products poor in hydrogen may be used as initial materials for the production of non-knocking low boiling hydrocarbons for instance by destructive hydrogenation under pressure and in the presence of catalysts.

The asphaltic products may be transformed into road asphalt, if desired, after treatment with selective agents, by blowing air through them, or they may be hydrogenated in order to obtain a good fuel oil.

The following example will further illustrate the nature of this invention but the invention is not restricted to this example. The parts are by weight.

*Example*

40 parts of mid-German brown coal are made into a paste with 60 parts of tetrahydronaphthalene containing 10 per cent of naphthalene and extracted under a pressure of 150 atmospheres at a temperature of 410° centigrade. In this way 87 per cent of the water-free and ash-free coal passes into solution. The product leaving the extraction apparatus, after distilling off the water of reaction, is filtered under pressure at a temperature of 180° centigrade in order to separate the insoluble solid substances and the residue remaining on the filter is washed thoroughly with the extraction agent.

The extract is then freed from extraction agent by distillation and transferred at about 150° centigrade into a continuously-working centrifuge capable of being heated. In this way it is divided into 30 per cent of wax-like products and 70 per cent of asphaltic products.

What we claim is:

1. An improved process for working up liquefaction products from solid bituminous carbonaceous materials containing insoluble non-carbonaceous substances comprising extracting the solid carbonaceous material with a suitable solvent at a temperature above about 370° C. to dissolve both asphaltic and waxy constituents, separating the undissolved portions from the resulting solution, removing a portion of the solvent by distillation from said solution and adding a second solvent which has a high solvent capacity for the waxy fractions and a low solvent capacity for the asphaltic fractions, then slowly chilling the solution to a temperature sufficient to precipitate the asphaltic constituents but to maintain the waxy constituents in solution and mechanically separating the waxy and the asphaltic fractions.

2. Process according to claim 1 in which the said chilling is conducted to a temperature of about 150° C. and the said separation is conducted at about this temperature.

3. An improved process for working up liquefaction products from solid bituminous carbonaceous materials containing insoluble non-carbonaceous substances and selected from the class consisting of mineral coals, brown coals, shales and peat comprising extracting the said solid carbonaceous material with a suitable solvent at a temperature above about 370° C. to dissolve both asphaltic and waxy constituents, separating the undissolved portions from the resulting solution, removing at least a portion of the solvent from said solution, then slowly chilling the remaining solution of asphaltic and waxy constituents to a temperature sufficient to cause separation of the asphaltic constituents as a relatively heavier layer from a relatively lighter liquid wax layer and mechanically separating the waxy and the asphaltic layers.

4. Process according to claim 3 in which about 80–95% of the said solvent is removed from the solution prior to the said chilling.

5. Process according to claim 3 in which a second solvent which has a high solvent capacity for the waxy fractions and a low solvent capacity for the asphaltic fractions is added to the said extracted solution prior to the said chilling.

MATHIAS PIER.
WALTER KROENIG.
WOLFGANG JAECKH.